United States Patent
Iwami

(10) Patent No.: US 6,955,614 B2
(45) Date of Patent: Oct. 18, 2005

(54) GOLF BALL

(75) Inventor: Satoshi Iwami, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 10/319,504

(22) Filed: Dec. 16, 2002

(65) Prior Publication Data

US 2003/0139230 A1 Jul. 24, 2003

(30) Foreign Application Priority Data

Dec. 17, 2001 (JP) ........................................ 2001-383107

(51) Int. Cl.$^7$ ............................................... A63B 37/12
(52) U.S. Cl. ........................................................ 473/378
(58) Field of Search ................................. 473/351, 377, 473/378

(56) References Cited

U.S. PATENT DOCUMENTS

| | | | |
|---|---|---|---|
| 3,395,109 A | 7/1968 | Molitor et al. | |
| 3,989,568 A | 11/1976 | Isaac | |
| 4,123,061 A | 10/1978 | Dusbiber | |
| 4,248,432 A | 2/1981 | Hewitt et al. | |
| 4,884,814 A | 12/1989 | Sullivan | |
| 5,120,791 A | 6/1992 | Sullivan | |
| 5,929,189 A | 7/1999 | Ichikawa et al. | |
| 6,251,991 B1 | 6/2001 | Takesue et al. | |
| 6,435,986 B1 * | 8/2002 | Wu et al. | 473/378 |
| 6,486,261 B1 * | 11/2002 | Wu et al. | 525/332.6 |
| 6,562,909 B2 * | 5/2003 | Morgan | 525/237 |
| 6,582,326 B2 * | 6/2003 | Wu et al. | 473/378 |

FOREIGN PATENT DOCUMENTS

| | | |
|---|---|---|
| EP | 0 467 622 A1 | 1/1992 |
| GB | 2 278 364 A | 11/1994 |
| JP | 51-74726 | 6/1976 |
| JP | 5-3931 A | 1/1993 |
| JP | 6-299052 A | 10/1994 |
| JP | 6-327794 A | 11/1994 |
| JP | 2662909 B2 | 6/1997 |
| JP | 2709950 B2 | 10/1997 |
| JP | 9-271538 A | 10/1997 |
| JP | 11-128401 A | 5/1999 |
| JP | 11-128402 A | 5/1999 |

* cited by examiner

Primary Examiner—Raeann Gorden
(74) Attorney, Agent, or Firm—Birch Stewart Kolasch & Birch LLP

(57) ABSTRACT

A golf ball, which is superior in rebound characteristics, spin performance, scuff resistance, yellowing resistance and productivity, and has good moldability including a core and a cover formed on the core, wherein the cover includes a mixture (c) of a component (a) and a component b) as a base resin, wherein the elastic modulus of each component satisfies a relationship represented by the following formula:

$$E_a X + E_b Y > E_c$$

(wherein, $E_a$, $E_b$ and $E_c$ represent the elastic modulus of component (a), component (b) and mixture (c), respectively, and X and Y represent a formulation ratio of the component (a) and component (b)).

4 Claims, 1 Drawing Sheet

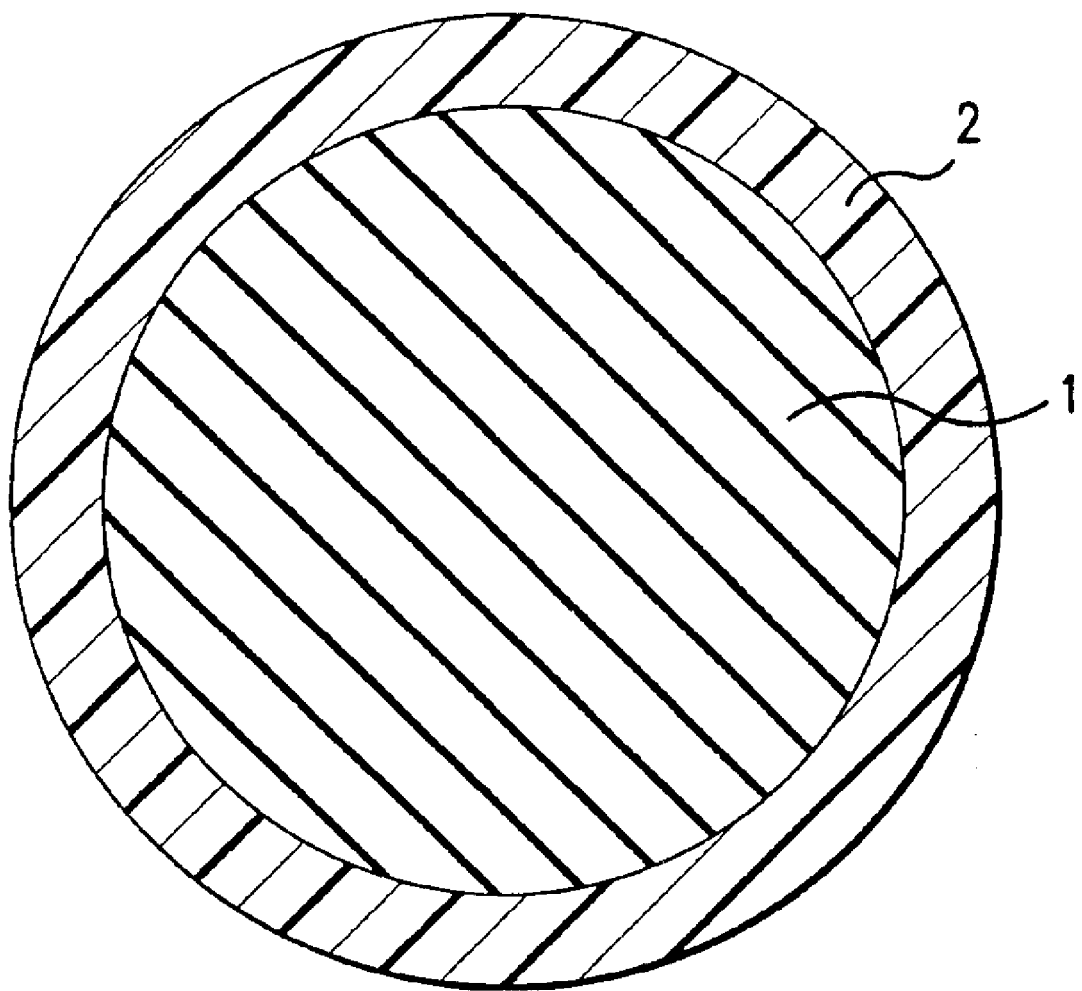
Figure

GOLF BALL

FIELD OF THE INVENTION

The present invention relates to a golf ball. More particularly, it relates to a golf ball, which is superior in rebound characteristics, spin performance, scuff resistance, yellowing resistance and productivity, and has good moldability.

BACKGROUND OF THE INVENTION

Recently, ionomer resin has been widely used for cover material of golf balls. This is because the ionomer resin is superior in rebound characteristics, durability, processability and the like. However, since the ionomer resin has high rigidity and hardness, there are problems that in the resulting golf ball, shot feel is hard and poor; and spin performance is not sufficiently obtained, which degrades controllability, when using ionomer resin alone as the cover material.

In order to solve the problems, it is attempted to soften the ionomer resin by various means. For example, it is proposed to blend the hard ionomer resin having high rigidity with terpolymer-based soft ionomer resin (Japanese Patent Kokai Publications No. 3931/1993, Japanese Patent No. 2709950 and the like) or blend the hard ionomer resin with thermoplastic elastomer (Japanese Patent Kokai Publications Nos. 299052/1994, 327794/1994 and the like) to soften the cover.

However, when good shot feel and spin performance are accomplished in case of using the blend of the hard ionomer with the soft ionomer resin, rebound characteristics of the resulting golf ball are largely degraded. In addition, since the surface of the cover of the golf ball is easily abraded by grooves on a face surface of the golf club when hit by an iron club, it is problem that the surface of the golf ball becomes fluffy or begins to split finely, and scuff resistance is poor.

When the blend of the hard ionomer with the thermoplastic elastomer is used, rebound characteristics are excellent compared with the blend with the soft ionomer resin, but the compatibility between the both is poor, and scuff resistance when hit by an iron club is poor compared with the blend with the soft ionomer resin.

In order to solve the problems, it has been suggested to use thermosetting polyurethane composition (Japanese Patent Kokai publication No. 74726/1976, Japanese Patent No. 2662909, U.S. Pat. No. 4,123,061 and the like), or polyurethane-based thermoplastic elastomer (U.S. Pat. Nos. 3,395,109, 4,248,432, Japanese Patent Kokai publication Nos. 271538/1997, 1280401/1999, 1280402/1999 and the like) as a cover material of golf ball. When the thermosetting polyurethane composition is used for the cover material, the scuff resistance, which is problem from using the blend of the hard ionomer resin with the soft ionomer resin or thermoplastic elastomer, is excellent. However, since a process of coating a cover on a core is complicated, large-scale production is difficult, and the productivity is degraded.

When the polyurethane-based thermoplastic elastomer is used for the cover material, compared with the thermosetting polyurethane composition, the productivity is improved, but it is difficult to thin the cover layer. When polyurethane-based thermoplastic elastomer formed by using typical diisocyanates, such as 2,4-tolylene diisocyanate, 2,6-tolylene diisocyanate or a mixture thereof (TDI), 4,4'-diphenylmethane diisocyanate (MDI) and the like, is used for the cover material, its strength is high, and scuff resistance of the resulting golf ball is excellent, but there is problem that yellowing is easy to occur, and it is required to further use white paint. In order to solve the problem, it has been suggested to use polyurethane-based thermoplastic elastomer formed by using aliphatic diisocyanate for the cover material (Japanese Patent Kokai publication No. 271538/1997). However, there is problem that its strength is low, and scuff resistance of the resulting golf ball is degraded, compared with the polyurethane-based thermoplastic elastomer formed by using aromatic diisocyanate.

OBJECTS OF THE INVENTION

A main object of the present invention is to provide a golf ball, which is superior in rebound characteristics, spin performance, scuff resistance, yellowing resistance and productivity, and has good moldability.

According to the present invention, the object described above has been accomplished by using a mixture of two components as a base resin of the cover; and selecting the components such that the sum of the product of an elastic modulus and a formulation ratio of each component is larger than an elastic modulus of the mixture, thereby providing a golf ball, which is superior in rebound characteristics, spin performance, scuff resistance, yellowing resistance and productivity, and has good moldability.

SUMMARY OF THE INVENTION

The present invention relates to a golf ball comprising a core and a cover formed on the core, wherein the cover comprises a mixture (c) of a component (a) and a component (b) as a base resin, and an elastic modulus of each component satisfies a relationship represented by the following formula:

$$E_a X + E_b Y > E_c$$

(wherein, $E_a$, $E_b$ and $E_c$ represent an elastic modulus of the component (a), that of the component (b) and that of the mixture (c), respectively, and X and Y represent a formulation ratio of the component (a) and that of the component (b)).

In order to put the present invention into a more suitable practical application, it is desired that the component (a) be polyurethane-based thermoplastic elastomer formed by using cycloaliphatic diisocyanate, and the component (b) be polyurethane-based thermoplastic elastomer formed by using aliphatic diisocyanate;

the cycloaliphatic diisocyanate is 4,4'-dicyclohexylmethane diisocyanate ($H_{12}$MDI), and the aliphatic diisocyanate is 1,6-hexamethylene diisocyanate (HDI);

a weight ratio (a/b) of the component (a) to the component (b) be 95/5 to 5/95; and the cover has a Shore D hardness of 30 to 55 and a thickness of 0.3 to 2.0 mm.

The present inventors variously have studied the relationship of cover materials and the performance of resulting golf balls, and found to improve rebound characteristics, spin performance and moldability (solidification velocity, releasability and the like) by using a mixture of two components as a base resin of the cover; and selecting the components such that the sum of the product of the elastic modulus and a formulation ratio of each component is larger than an elastic modulus of the mixture as represented by the above formula. Generally, when using a mixture of two components, the sum of the product of an elastic modulus and a formulation ratio of each component is nearly equal to the elastic modulus of the mixture. In addition, generally, the spin performance largely depends on the cover hardness and thus the higher the hardness of the cover material, the better is the moldability of the material. In the present invention, since the elastic modulus of the mixture is lower than that of components before mixing the two components, it is possible to use a material having a high elastic modulus (high hardness), and thus excellent spin performance and good moldability can be accomplished.

BRIEF DESCRIPTION OF THE DRAWING

The FIGURE of the present application shows the golf ball of the present invention.

DETAILED DESCRIPTION OF THE INVENTION

The golf ball of the present invention will be explained in detail. The golf ball of the present invention comprises a core 1 and a cover 2 covering the core. The core may be also the same one that has been conventionally used for solid golf balls, and may be obtained by uniformly mixing a rubber composition using a proper mixer such as a mixing roll, and then vulcanizing and press-molding the rubber composition in a mold into a spherical form under applied heat. The rubber composition comprises 10 to 60 parts by weight of a vulcanizing agent (crosslinking agent), for example, α, β-unsaturated carboxylic acid having 3 to 8 carbon atoms (such as acrylic acid, methacrylic acid, etc.) or mono or divalent metal salts thereof, such as zinc or magnesium salts thereof, or a functional monomer such as trimethyloipropane trimethacrylate, or a combination thereof;

0.5 to 5 parts by weight of co-crosslinking initiator such as organic peroxides;

10 to 30 parts by weight of filler such as zinc oxide, barium sulfate; and optionally organic sulfide compound, antioxidant and the like;

based on 100 parts by weight of a base rubber such as cis-1,4-polybutadiene rubber. The vulcanization may be conducted, for example, by press molding in a mold at 130 to 240° C. and 2.9 to 11.8 MPa for 15 to 60 minutes. It is preferable for the surface of the resulting core to be buffed to improve the adhesion to the cover formed on the core. However, such cores are given by way of illustrative examples only, and the invention shall not be limited thereto.

The core may have single-layered structure or multi-layered structure, which has two or more layers. When the core has multi-layered structure, the inmost layer of the core is preferably formed from the rubber composition comprising cis-1,4-polybutadiene as described above, but the other layer in the core may be formed from a resin component, such as thermoplastic resin.

In the golf ball of the present invention, it is suitable for the core to have a diameter of 38.8 to 42.2 mm, preferably 39.6 to 42.0 mm, more preferably 40.0 to 41.2 mm. When the diameter of the core is smaller than 38.8 mm, the cover is too thick, and the rebound characteristics are degraded. On the other hand, when the diameter is larger than 42.2 mm, the thickness of the cover is too thin, and the technical effects accomplished by the presence of the cover are not sufficiently obtained. In addition, it is difficult to mold.

In the golf ball of the present invention, it is desired for the core to have a deformation amount when applying from an initial load of 98 N to a final load of 1275 N of 2.5 to 4.5 mm, preferably 2.6 to 4.2 mm, more preferably 2.7 to 4.0 mm. When the deformation amount is smaller than 2.5 mm or larger than 4.5 mm, it is difficult to adjust the deformation amount of the resulting golf ball to a proper range, and the shot feel and flight distance are degraded.

In the golf ball of the present invention, it is advantageous in view of flight distance when hit by a driver or middle iron club, for the core to have a hardness distribution such that the center point is the softest and the outer portion has a higher hardness in order, and it is desired for the core to have a hardness difference in Shore D hardness between the center point and the surface of 15 to 45, preferably 18 to 40, more preferably 20 to 40. When the hardness difference is smaller than 15, proper initial flight performance is not obtained, which reduces the flight distance. On the other hand, when the hardness difference is larger than 45, the durability is poor.

In the golf ball of the present invention, it is desired for the core to have a center hardness in Shore D hardness of 20 to 50, preferably 30 to 45. When the center hardness is lower than 20, it is difficult to adjust the deformation amount of the core-to a proper range, and rebound characteristics of, the resulting golf ball are degraded. On the other hand, when the center hardness is higher than 50, the hardness difference from the surface of the core is too small, which degrades its shot feel or flight distance of the resulting golf ball.

In the golf ball of the present invention, it is desired for the core to have a surface hardness in Shore D hardness of 45 to 72, preferably 50 to 70, more preferably 50 to 68. When the hardness is lower than 45, it is difficult to adjust the deformation amount of the core to a proper range, and rebound characteristics of the resulting golf ball are degraded. On the other hand, when the hardness is higher than 72, the core is too hard, and the shot feel of the resulting golf ball is hard and poor. The term "a surface hardness of the core" as used herein refers to the hardness, which is determined by measuring the hardness at the surface of the outmost layer in the whole core, whether the, core has a single-layered structure or a multi-layered structure. The term "a center hardness of the core" as used herein refers to the hardness, which is obtained by cutting the core into two equal parts and then measuring the hardness at the center point in section.

In the golf ball of the present invention, when the core has a multi-layered structure composed of an inner core and at least one layer of an outer core, the outer core may be formed from the rubber composition as used in the inner core, or from a thermoplastic resin, particularly an ionomer resin, which can be typically used for the cover of golf balls, as a base resin. The ionomer resin may be a copolymer of α-olefin and α, β-unsaturated carboxylic acid having 3 to 8 carbon atoms, of which a portion of carboxylic acid groups is neutralized with metal ion; a terpolymer of α-olefin, α, β-unsaturated carboxylic acid having 3 to 8 carbon atoms and α, β-unsaturated carboxylic acid ester, of which a portion of carboxylic acid groups is neutralized with metal ion; or mixtures thereof. Examples of the α-olefins in the ionomer preferably include ethylene, propylene and the like. Examples of the α, β-unsaturated carboxylic acid in the ionomer include acrylic acid, methacrylic acid, fumaric acid, maleic acid, crotonic acid and the like, and preferred are acrylic acid and methacrylic acid. Examples of the α, β-unsaturated carboxylic acid ester in the ionomer include methyl ester, ethyl ester, propyl ester, n-butyl ester and isobutyl ester of acrylic acid, methacrylic acid, fumaric acid, maleic acid, crotonic acid and the like. Preferred are acrylic acid esters and methacrylic acid esters. The metal ion which neutralizes a portion of carboxylic acid groups of the copolymer or terpolymer includes an alkali metal ion, such as a sodium ion, a potassium ion, a lithium ion and the like; a divalent metal ion, such as a zinc ion, a calcium ion, a magnesium ion and the like; a trivalent metal ion, such as an aluminum ion, a neodymium ion and the like; and mixture thereof. Preferred are sodium ions, zinc ions, lithium ions and the like, in view of rebound characteristics, durability and the like.

The ionomer resin is not limited, but examples thereof will be shown by a trade name thereof. Examples of the ionomer resins, which are commercially available from Du Pont-Mitsui Polychemicals Co., Ltd. include Hi-milan 1555, Hi-milan 1557, Hi-milan 1601, Hi-milan 1605, Hi-milan 1652, Hi-milan 1702, Hi-milan 1705, Hi-milan 1706, Hi-milan 1707, Hi-milan 1855, Hi-milan 1856, Hi-milan AM7316 and the like. Examples of the ionomer resins, which are commercially available from Du Pont Co., include Surlyn 8945, Surlyn 9945, Surlyn 6320, Surlyn 8320, Surlyn AD8511, Surlyn AD8512, Surlyn AD8542 and the like. Examples of the ionomer resins, which are commercially available from Exxon Chemical Co., include Iotek 7010, Iotek 8000 and the like. These ionomer resins may be used alone or in combination.

As the materials suitably used in the outer core of the present invention, the above ionomer resin may be used alone, but the ionomer resin may be used in combination with at least one of thermoplastic elastomer, diene-based block copolymer and the like. Examples of the thermoplastic elastomers include polyamide-based thermoplastic elastomer, which is commercially available from Toray Co., Ltd. under the trade name of "Pebax" (such as "Pebax 2533"); polyester-based thermoplastic elastomer, which is commercially available from Toray-Do Pont Co., Ltd. under the trade name of "Hytrel" (such as "Hytrel 3548", "Hytrel 4047"); polyurethane-based elastomer, which is commercially available from Takeda Badishes Urethanes Industries, Ltd. under the trade name of "Elastollan" (such as "Elastollan ET880"); and the like.

The diene-based block copolymer is a block copolymer or partially hydrogenated block copolymer having double bond derived from conjugated diene compound. The base bock copolymer is block copolymer composed of block polymer block A mainly comprising at least one aromatic vinyl compound and polymer block B mainly comprising at least one conjugated diene compound. The partially hydrogenated block copolymer is obtained by hydrogenating the block copolymer. Examples of the aromatic vinyl compounds comprising the block copolymer include styrene, α-methyl styrene, vinyl toluene, p-t-butyl styrene, 1,1-diphenyl styrene and the like, or mixtures thereof. Preferred is styrene. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof. Examples of the diene block copolymers include an SBS (styrene-butadiene-styrene) block copolymer having polybutadiene block with epoxy groups or SIS (styrene-isoprene-styrene) block copolymer having polyisoprene block with epoxy groups and the like. Examples of the diene block copolymers which is commercially available include the diene block copolymers, which are commercially available from Daicel Chemical Industries, Ltd. under the trade name of "Epofriend" (such as "Epofriend A1010"), the diene block copolymers, which are commercially available from Kuraray Co., Ltd. under the trade name of "Septon" (such as "Septon HG-252") and the like.

The amount of the thermoplastic elastomer or diene block copolymer is 1 to 60 parts by weight, preferably 1 to 35 parts by weight, based on 100 parts by weight of the base resin for the outer core. When the amount is smaller than 1 part by weight, the technical effect of improving the shot feel of the golf ball is not sufficiently obtained. On the other hand, when the amount is larger than 60 parts by weight, the outer core is too soft, and the rebound characteristics of the resulting golf ball are degraded. In addition, the compatibility with the ionomer resin is degraded, and the durability is degraded.

When the core has multi-layered structure and the outer core is formed from rubber composition, the rubber composition is mixed, and coated on the inner core into a concentric sphere, and then vulcanized by press-molding at 160 to 180° C. for 10 to 20 minutes in the mold to obtain a core, which is formed by covering the outer core on the inner core. When the core has multi-layered structure and the outer core is formed from thermoplastic resin, the resin composition for the outer core is directly injection molded on the inner core to obtain the core. It is preferable for the surface of the resulting core to be buffed to improve the adhesion to the cover formed on the core.

The cover is then covered on the core. In the golf ball of the present invention, it is required for the cover to comprise a mixture (c) of a component (a) and a component (b) as a base resin, and the elastic modulus of each component satisfies a the relationship represented by the following formula:

$$E_a X + E_b Y > E_c$$

(wherein, $E_a$, $E_b$ and $E_c$ represent the elastic modulus of component (a), component (b) and mixture (c), respectively, and X and Y represent a formulation ratio of component (a) and component (b)). The term "elastic modulus" as used herein refers to storage elastic modulus (E') at 25° C. determined by dynamic viscoelastic measurement at a frequency of 10 Hz.

In the present invention, it is meant that when high elastic modulus materials are used for component (a) and component (b), the elastic modulus of the mixture of the both is lower than the calculated elastic modulus from the formulation ratio thereof. Generally, the spin performance largely depends to cover hardness (the lower hardness the cover material has, the higher the spin amount is) and the higher hardness the cover material has, the better moldability (solidification velocity, releasability and the like) the material has. In the present invention, since the mixture of high elastic modulus materials is used for the cover, the moldability, such as solidification velocity and releasability, and rebound characteristics are improved. In addition, since the elastic modulus of the mixture is low, the spin performance is excellent.

On the other hand, when a high elastic modulus material is used alone for the cover, the moldability, such as solidification velocity and releasability is good, but the spin performance is poor. When a low elastic modulus material is used alone for the cover, in the moldability, particularly the solidification velocity is small, and the resulting golf ball after molding the cover has tack, which degrades the productivity. When a material, which satisfy the relationship represented by the formula:

$$E_a X + E_b Y = E_c$$

is used for the cover, it is required to increase the elastic modulus in order to improve the moldability, but thereby the spin performance is degraded. On the other hand, it is required to decrease the elastic modulus in order to improve the spin performance, but thereby the moldability is poor. Therefore, it is very difficult to accomplish the balance between good moldability and excellent spin performance.

In the golf ball of the present invention, it is required for the cover to satisfy the relationship represented by the following formula:

$$E_a X + E_b Y > E_c$$

that is, $$(E_a X + E_b Y)/E_c > 1.0$$

preferably $$(E_a X + E_b Y)/E_c \geq 1.1$$

more preferably $$(E_a X + E_b Y)/E_c \geq 1.2$$

most preferably $$(E_a X + E_b Y)/E_c \geq 1.3$$

When the value of $E_c$ is too small, the balance between good moldability and excellent spin performance is not sufficiently accomplished. Therefore, the relationship is represented by the followed formula:

$$(E_a X + E_b Y)/E_c \leq 3.0$$

preferably $$(E_a X + E_b Y)/E_c \leq 2.0$$

It is desired for $E_a$, the elastic modulus of the component (a) to be within the range of 2 to 1200 MPa, preferably 5 to 1000 MPa. When the $E_a$ is lower than 2 MPa, the cover is too soft, and the moldability is poor. On the other hand, when the $E_a$ is higher than 1200 MPa, the cover is too hard, the spin amount is small.

It is desired for $E_b$, the elastic modulus of the component (b) to be within the range of 2 to 1,200 MPa, preferably 5 to 1,000 MPa. When the $E_b$ is lower than 2 MPa, the cover is too soft, and the moldability is poor. On the other hand, when the $E_b$ is higher than 1,200 MPa, the cover is too hard, the spin amount is small.

It is desired for $E_c$, the elastic modulus of the mixture (c) of the component (a) and the component (b) to be within the range of 1 to 1,000 MPa, preferably 5 to 800 MPa. When the $E_c$ is lower than 1 MPa, the cover is too soft, and the moldability is poor. On the other hand, when the $E_c$ is higher than 1,000 MPa, the cover is too hard, the spin amount is small.

In the golf ball of the present invention, it is desired that the component (a) be polyurethane-based thermoplastic elastomer formed by using cycloaliphatic diisocyanate, and the component (b) be polyurethane-based thermoplastic elastomer formed by using aliphatic diisocyanate. That is, it is desired for the cover to comprise a mixture of polyurethane-based thermoplastic elastomer formed by using cycloaliphatic diisocyanate and polyurethane-based thermoplastic elastomer formed by using aliphatic diisocyanate as a base resin. When polyurethane-based thermoplastic elastomer formed by using cycloaliphatic diisocyanate is used as a base resin for the cover, the resulting golf ball is superior in yellowing resistance and scuff resistance. When polyurethane-based thermoplastic elastomer formed by using aliphatic diisocyanate is used as a base resin for the cover, the moldability is improved while maintaining good yellowing resistance.

If polyurethane-based thermoplastic elastomer formed by using general cycloaliphatic diisocyanate is used alone as a base resin for the cover, the cohesion is too small and the solidification immediately after molding is slow. Therefore there is problem as to the moldability that the resulting golf balls adhere to each other by the tack of the golf ball immediately after molding (injection molding or press molding) or the mold open time is long, which degrades the productivity. The present inventors could solve the problem by mixing the polyurethane-based thermoplastic elastomer formed by using aliphatic diisocyanate, of which the cohesion is large and the solidification immediately after molding is fast, with polyurethane-based thermoplastic elastomer formed by using cycloaliphatic diisocyanate. In addition, the present inventors found that the elastic modulus was low (the hardness was low) after mixing. As a result, the technical effects of providing the cover material having both good moldability and excellent spin performance can be obtained.

Polyurethane-based thermoplastic elastomer generally contains polyurethane structure as hard segment and polyol such as polyester polyol or polyether polyol as soft segment. The polyurethane structure generally contains diisocyanate and curing agent, such as amine-based curing agent. The polyurethane-based thermoplastic elastomer used for the cover of the present invention is polyurethane-based thermoplastic elastomer that the diisocyanate is cycloaliphatic diisocyanate or aliphatic diisocyanate. The kind of the diisocyanate has greater effect on the performance of the resulting cover, such as yellowing resistance, than the kind of the polyol. Therefore, in the present invention, it was considered that the kind of the diisocyanate was important.

Examples of the cycloaliphatic diisocyanates include one or combination of two or more selected from the group consisting of 4,4'-dicyclohexylmethane diisocyanate ($H_{12}$MDI), which is hydrogenated compound of 4,4'-diphenylmethane diisocyanate (MDI); 1,3-bis(isocyanatomethyl) cyclohexane ($H_6$XDI), which is hydrogenated compound of xylylene diisocyanate (XDI); isophorone diisocyanate (IPDI); and trans-1,4-cyclohexane diisocyanate (CHDI). Preferred is the $H_{12}$MDI in view of general-purpose properties and processability. Concrete examples of the polyurethane-based thermoplastic elastomer formed by using the $H_{12}$MDI include polyurethane-based thermoplastic elastomers, which are commercially available from BASF Polyurethane Elastomers Co., Ltd. under the trade name of "Elastollan XNY90A", "Elastollan XNY97A", "Elastollan XNY585", and the like.

Examples of the aliphatic diisocyanates include one or combination of two or more selected from the group consisting of 1,6-hexamethylene diisocyanate (HDI), 2,2,4-(2,2,4)-trimethylene hexamethylene diisocyanate (TMDI) and lysine diisocyanate (LDI). Preferred is the HDI. Concrete examples of the polyurethane-based thermoplastic elastomer formed by using the HDI include polyurethane-based thermoplastic elastomer, which is commercially available from Dainippon Ink & Chemicals Inc. under the trade name of "Pandex T-7890" (trade name), and the like.

Preferred are polyurethane-based thermoplastic elastomers formed by using diisocyanate having no double bond in backbone structure in molecule, that is, aliphatic diisocyanate and cycloaliphatic diisocyanate in view of yellowing resistance. Preferred are polyurethane-based thermoplastic elastomers formed by using cycloaliphatic diisocyanate and aromatic diisocyanate, which have high mechanical strength, in view of scuff resistance. Therefore, in the present invention, preferred is a mixture of polyurethane-based thermoplastic elastomer formed by using cycloaliphatic diisocyanate and polyurethane-based thermoplastic elastomer formed by using aliphatic diisocyanate, in view of both the yellowing resistance and scuff resistance.

The blend ratio by weight (a/b) of the component (a) to the component (b) in the mixture is 95/5 to 5/95, preferably 90/10 to 10/90, more preferably 80/20 to 20/80. When the amount of the component (a) or the component (b) is larger than 95% by weight (smaller than 5% by weight), the technical effects accomplished by blending the both are not sufficiently obtained. If the component (a) is polyurethane-based thermoplastic elastomer formed by using cycloaliphatic diisocyanate, and the component (b) is polyurethane-based thermoplastic elastomer formed by using aliphatic diisocyanate, when the amount of the component (a) is smaller than 5% by weight, the scuff resistance of the resulting golf ball is degraded. On the other hand, when the amount is larger than 95% by weight, the technical effects accomplished by blending the polyurethane-based thermoplastic elastomer formed by using aliphatic diisocyanate are not sufficiently obtained, and the moldability is not sufficiently improved.

In the golf ball of the present invention, the cover composition may optionally contain pigments (such as titanium dioxide, etc.) and the other additives such as a dispersant, an antioxidant, a UV absorber, a photostabilizer and a fluorescent agent or a fluorescent brightener, etc., in addition to the above resin component as long as the addition of the additives does not deteriorate the desired performance of the golf ball cover. If used, the amount of the pigment is preferably 0.1 to 5 parts by weight, based on 100 parts by weight of the resin component for the cover.

A method of covering on the core with the cover is not specifically limited, but may be a conventional method. For example, there can be used a method comprising molding the cover composition into a semi-spherical half-shell in advance, covering the core with the two half-shells, followed by press molding at 160 to 200° C. for 1 to 10 minutes, or a method comprising injection molding the cover composition directly on the core, which is covered with the cover, to cover it. Preferred is the method comprising press molding in view of the uniformity of the cover thickness.

In the golf ball of the present invention, it is desired for the cover to have a thickness of 0.3 to 2.0 mm, preferably 0.5 to 1.6 mm, more preferably 0.5 to 1.2 mm. When the thickness is smaller than 0.3 mm, the cover is too thin, and it is difficult to mold the cover. On the other hand, when the thickness is larger than 2.0 mm, the cover is too thick, and the rebound characteristics of the resulting golf ball are degraded, which reduces the flight distance.

In the golf ball of the present invention, it is desired for the cover to have a Shore D hardness of 30 to 55, preferably 35 to 55, more preferably 38 to 50. When the hardness is lower than 30, the cover is too soft, and the rebound characteristics and scuff resistance are degraded. On the other hand, when the hardness is higher than 55, the cover is too hard, and the desired spin amount is not sufficiently obtained. In addition, the shot feel is hard and poor. The term "a hardness of the cover" as used herein refers to the hardness (slab hardness) measured using a sample of a heat and press molded sheets from the cover composition.

At the time of molding the cover, many depressions called "dimples" may be formed on the surface of the golf ball. Furthermore, paint finishing or marking with a stamp may be optionally provided after the cover is molded for commercial purposes.

In the golf ball of the present invention, it is desired to have a deformation amount when applying from an initial load of 98 N to a final load of 1275 N of 2.50 to 3.10 mm, preferably 2.60 to 3.00 mm, more preferably 2.65 to 2.90 mm. When the deformation amount is smaller than 2.50 mm, the golf ball is too hard, and the shot feel is hard and poor. In addition, the spin amount when hit by a diver and an iron club is large. On the other hand, when the deformation amount is larger than 3.10 mm, the golf ball is too soft, and the rebound characteristics are degraded. In addition, the shot feel is heavy and poor.

The golf ball of the present invention is formed, so that it has a diameter of not less than 42.67 mm (preferably 42.67 to 42.80 mm) and a weight of not more than 45.93 g, in accordance with the regulations for golf balls.

The diameter of golf balls is limited to not less than 42.67 mm in accordance with the regulations for golf balls as described above. Generally, when the diameter of the golf ball is large, air resistance of the golf ball on a flight is large, which reduces the flight distance. Therefore, most of golf balls commercially available are designed to have a diameter of 42.67 to 42.82 mm. The present invention is applicable to the golf balls having the diameter. There are golf balls having large diameter in order to improve the easiness of hitting. In addition, there are cases where golf balls having a diameter out of the regulations for golf balls are required depending on the demand and object of users. Therefore, it can be considered for golf balls to have a diameter of 42 to 44 mm, more widely 40 to 45 mm. The present invention is also applicable to the golf balls having the diameter. In addition, the golf ball of the present invention has a weight of 44 to 46 g, preferably 45.00 to 45.93 g.

EXAMPLES

The following Examples and Comparative Examples further illustrate the present invention in detail but are not to be construed to limit the scope of the present invention.

Production of Core (Core I) Single-layer Structured Core

The rubber composition for the core having the formulation shown in Table 1 was mixed, and then vulcanized by press-molding in the mold at 170° C. for 15 minutes to obtain spherical core having a diameter of 40.0 mm.

(Core II) Two-layer Structured Core (i) Production of Inner Core

The rubber composition for the inner core having the formulation shown in Table 1 was mixed, and then vulcanized by press-molding in the mold at 170° C. for 15 minutes to obtain spherical inner core having a diameter of 37.0 mm.

(ii) Production of Two-layer Structured Core

The composition for the outer core having the formulation shown in Table 1 was directly injection molded on the inner core produced in the step (i) to obtain spherical two-layer structured core having a diameter of 40.0 mm.

(Core III) Two-layer Structured Core

(i) Production of Inner Core

The rubber composition for the inner core having the formulation shown in Table 1 was mixed, and then vulcanized by press-molding in the mold at 170° C. for 15 minutes to obtain spherical inner core having a diameter of 32.5 mm.

(ii) Production of Two-layer Structured Core

The rubber composition for the outer core having the formulation shown in Table 1 was mixed, and coated on the inner core produced in the step (i) into a concentric sphere, and then vulcanized by press-molding in the mold at 170° C. for 15 minutes to obtain spherical two-layer structured core having a diameter of 40.0 mm.

The deformation amount, center hardness (a) and surface hardness (b) of the resulting core were measured, and the hardness difference (b-a) was determined by calculation. The results are shown in the same Table.

TABLE 1

| Core composition | (parts by weight) | | |
|---|---|---|---|
| | I | II | III |
| (Core or inner core) | | | |
| BR-18 *1 | 100 | 100 | 100 |
| Zinc acrylate | 33 | 33 | 33 |
| Zinc oxide | 12.0 | 14.0 | 7.5 |
| Dicumyl peroxide *2 | 1.0 | 1.0 | 0.8 |
| Diphenyl disulfide *3 | 0.5 | 0.5 | 0.5 |
| (Outer core) | | | |
| BR-18 *1 | — | — | 100 |
| Zinc acrylate | — | — | 37 |
| Zinc oxide | — | — | 11.0 |
| Dicumyl peroxide *2 | — | — | 0.7 |
| Diphenyl disulfide *3 | — | — | 0.5 |
| Hi-milan 1605 *4 | — | 50 | — |
| Hi-milan 1706 *5 | — | 50 | — |
| Deformation amount (mm) | 2.85 | 2.60 | 2.70 |
| Shore D hardness | | | |
| Center hardness (a) | 35 | 35 | 36 |
| Surface hardness (b) | 53 | 70 | 55 |
| Hardness difference (b − a) | 18 | 35 | 19 |

*1: High-cis polybutadiene commercially available from JSR Co., Ltd., under the trade name "BR-18" (Content of cis-1,4-polybutadiene = 96%)
*2: Diphenyl disulfide commercially available from Sumitomo Seika Co., Ltd.
*3: Dicumyl peroxide, commercially available from Nippon Oil & Fats Co., Ltd. under the trade name of "Percumyl D"
*4: Hi-milan 1605 (trade name), ethylene-methacrylic acid copolymer ionomer resin obtained by neutralizing with sodium ion, manufactured by Du Pont-Mitsui Polychemicals Co., Ltd.
*5: Hi-milan 1706 (trade name), ethylene-methacrylic acid copolymer ionomer resin obtained by neutralizing with zinc ion, manufactured by Du Pont-Mitsui Polychemicals Co., Ltd.

Preparation of Cover Compositions

The formulation materials for the cover showed in Table 2 were mixed using a kneading type twin-screw extruder to obtain pelletized cover compositions. The extrusion condition was, a screw diameter of 45 mm,
a screw speed of 200 rpm,
a screw L/D of 35.

The formulation materials were heated at 200 to 260° C. at the die position of the extruder. The hardness were determined, using a sample of a stack of the three or more heat and press molded sheets having a thickness of about 2 mm from the cover composition, which had been stored at 23° C. for 2 weeks, with a Shore D hardness meter according to ASTM D 2240-68. The results are shown as cover hardness in Tables 2 to 4. The elastic modulus was measured by using the cover composition as a sample, and the result is shown in the same Tables. The test method is as described later.

TABLE 2

| Cover composition | (parts by weight) | | | | | | |
|---|---|---|---|---|---|---|---|
| | A | B | C | D | E | F | G |
| Elastollan ET195-clear *6 | 50 | — | — | — | — | — | — |
| $H_{12}$MDI-PC94A *7 | — | 100 | 80 | 50 | 20 | — | — |
| HMDI-PC94A *8 | — | — | 20 | 50 | 80 | 100 | — |
| Elastollan ET295-clear *9 | 50 | — | — | — | — | — | — |
| Elastollan XNY90A *10 | — | — | — | — | — | — | 100 |
| Titanium oxide | 4 | 4 | 4 | 4 | 4 | 4 | 4 |
| Cover hardness (Shore D) | 47 | 46 | 44 | 42 | 44 | 46 | 39 |
| Elastic modulus (10 MPa) | 6.8 | 6.2 | 4.2 | 3.7 | 4.4 | 6.1 | 3.5 |

*6: Elastollan ET195-clear (trade name), polyurethane-based thermoplastic elastomer formed by using 4,4'-diphenylmethane diisocyanate (MDI), commercially available from BASF Polyurethane Elastomers Co., Ltd.; Shore A (JIS-A) hardness = 95, Storage elastic modulus E' = 6.9 × 10 MPa
*7: Polyurethane-based thermoplastic elastomer formed by using $H_{12}$MDI and polycarbonate diol (PC), commercially available from BASF Polyurethane Elastomers Co., Ltd.; Shore A (JIS-A) hardness = 94, E' = 6.2 × 10 MPa
*8: Polyurethane-based thermoplastic elastomer formed by using $H_{12}$MDI and polycaprolactone diol (PCL), commercially available from BASF Polyurethane Elastomers Co., Ltd.; Shore A (JIS-A) hardness = 97, E' = 6.1 × 10 MPa
*9: Elastollan ET295-clear (trade name), polyurethane-based thermoplastic elastomer formed by using 4,4'-diphenylmethane diisocyanate (MDI), commercially available from BASF Polyurethane Elastomers Co., Ltd.; Shore A (JIS-A) hardness = 95, E' = 6.7 × 10 MPa
*10: Elastollan XNY90A (trade name), polyurethane-based thermoplastic elastomer formed by using 4,4'-dicyclohexylmethane diisocyanate ($H_{12}$MDI) (= hydrogenated MDI) and polyoxytetramethylene glycol (PTMG), commercially available from BASF Polyurethane Elastomers Co., Ltd.; Shore A (JIS-A) hardness = 90, E' = 3.5 × 10 MPa

Examples 1 to 5 and Comparative Examples 1 to 4

The cover composition was covered on the core obtained as described above by injection molding to form a cover layer having a thickness of 1.4 mm. As the moldability, the releasability and tack were evaluated. The results are shown in Table 3 (Examples) and Table 4 (Comparative Examples). Then, clear paint was coated on the surface of the cover layer after deflashing to obtain a golf ball having a diameter of 42.8 mm and a weight of 45.4 g. With respect to the resulting golf balls, the deformation amount, coefficient of restitution, spin amount, scuff resistance and yellowing resistance were measured or evaluated. The results are shown in the same Tables. The test methods are as follows.

Test Methods (1) Deformation Amount

The deformation amount was determined by measuring a deformation amount, when applying from an initial load of 98 N to a final load of 1275 N on the core or golf ball.

(2) Hardness
(2-1) Core Hardness

The surface hardness of the core was determined by measuring a Shore D hardness at the surface of the resulting core. The center hardness of the core was determined by cutting the core into two equal parts and then measuring a Shore D hardness at the center point in section. The Shore D hardness was measured using a Shore D hardness meter according to ASTM D 2240-68.

(2-2) Cover Hardness (Slab Hardness)

The cover hardness was determined by measuring a Shore D hardness, using a sample of a stack of the three or more heat and press molded sheets having a thickness of about 2 mm from the cover composition, which had been stored at 23° C. for 2 weeks. The Shore D hardness was measured using a Shore D hardness meter according to ASTM D 2240-68.

(3) Dynamic Viscoelastic Measurement

A specimen of 4 mm (width)×30 mm (length)×0.2 mm (thickness) prepared from the cover composition is forcibly vibrated using FT-Rheospectra DVE-V4 type, manufactured by Rheology Co. at the following conditions, to measure a vibration amplitude ratio and a phase lag between drive part and response part, whereby temperature-dependent curves of a storage elastic modulus were obtained.

Deformation mode: simple stretching (in the direction of the length)

Frequency: 10 Hz

Vibrational amplitude: 0.025% (5 μm)

Distance between chucks: 20 mm (Deformation part length)

Measuring temperature range: −100 to 100° C.

Heating rate: 3° C./min

The values of the storage elastic modulus at 25° C. determined from the temperature-dependent curves are shown as the elastic modulus of each cover.

(4) Moldability (4-1) Releasability

The golf ball was molded in a mold by using an automatic handling machine, cooled for 30 seconds, and picked up from the mold using an automatic pick-up device, as one cycle. If the pick-up device failed in the pick-up of the golf ball, the golf ball is picked up by inching the device. The releasability is evaluated by the number of inching until the golf ball is picked up. When the golf ball is picked up from the mold without inching, the releasability is good. The molding was conducted 10 cycles for each golf ball, and the total number of inching is shown as the result of the golf ball. The evaluation criteria are as follows.

Evaluation Criteria

○: The golf ball was picked up from the mold without inching.

Δ: The golf ball was picked up from the mold at the number of inching of 1 to 4.

x: The golf ball was picked up from the mold at the number of inching of not less than 5.

(4-2) Tack After Molding

The golf balls removed from the mold after molding and cooling for 30 seconds were maintained in contact with each other for about one minute, and the tack of the golf ball after molding was determined by evaluating the state of adhesion between the golf balls. The evaluation criteria are as follows.

Evaluation Criteria

○: The golf balls do not adhere to each other.

x: The golf balls adhere to each other.

(5) Coefficient of Restitution

An aluminum cylinder having a weight of 200 g was struck at a speed of 45 m/sec against a golf ball, and the velocity of the cylinder and the golf ball after the strike were measured. The coefficient of restitution of the golf ball was calculated from the velocity and the weight of both the cylinder and golf ball before and after strike. The measurement was conducted 5 times for each golf ball, and the average is shown as the coefficient of restitution of the golf ball.

(6) Scuff Resistance

After a pitching wedge (PW) commercially available was mounted to a swing robot manufactured by True Temper Co., two points on the surface of each golf ball was hit at a head speed of 36 m/sec one time for each point. The two points were evaluated by checking the surface appearance by visual observation. The evaluation criteria are as follows.

Evaluation Criteria

○: The surface of the golf ball slightly has a cut, but it is not particularly noticeable.

Δ: The surface of the golf ball clearly has a cut, and the surface becomes fluffy.

x: The surface of the golf ball is considerably chipped off, and the surface noticeably becomes fluffy.

(7) Yellowing Resistance

The resulting golf ball was expose to a sunshine weather meter manufactured by Suga Test Instruments Co., Ltd. for 120 hours. The Lab color difference ΔL, Δa and Δb) of the surface of the golf ball between before and after the exposure was measured by using a color-difference-colorimeter, which is commercially available from Minolta Co., Ltd. under the trade name "CR-221", and was represented by ΔE. The ΔE is determined by using the following formula:

$$\Delta E = [(\Delta L)^2 + (\Delta a)^2 + (\Delta b)^2]^{1/2}$$

The larger the value of color difference ΔE is, the less the yellowing resistance is.

Test Results

TABLE 3

| | Example No. | | | | |
|---|---|---|---|---|---|
| Test item | 1 | 2 | 3 | 4 | 5 |
| Core composition | I | II | II | II | III |
| Cover composition | D | C | D | E | D |
| Cover hardness (Golf ball) | 42 | 44 | 42 | 44 | 42 |
| Moldability(releasability) | ○ | ○ | ○ | ○ | ○ |
| Moldability(tack) | ○ | ○ | ○ | ○ | ○ |
| Deformation amount (mm) | 2.82 | 2.55 | 2.68 | 2.56 | 2.68 |
| Coefficient of restitution | 100 | 103 | 102 | 103 | 102 |
| Spin amount (rpm) | 7000 | 6850 | 6900 | 6880 | 6800 |
| Scuff resistance | ○ | ○ | ○ | ○ | ○ |
| Yellowing resistance | ○ | ○ | ○ | ○ | ○ |

TABLE 4

| | Comparative Example No. | | | |
|---|---|---|---|---|
| Test item | 1 | 2 | 3 | 4 |
| Core composition | II | II | II | II |
| Cover composition | A | B | F | G |
| Cover hardness (Golf ball) | 47 | 46 | 46 | 39 |
| Moldability(releasability) | ○ | x | ○ | x |
| Moldability(tack) | ○ | x | ○ | x |
| Deformation amount (mm) | 2.50 | 2.52 | 2.51 | 2.59 |

TABLE 4-continued

| Test item | Comparative Example No. | | | |
|---|---|---|---|---|
| | 1 | 2 | 3 | 4 |
| Coefficient of restitution | 6600 | 6500 | 6700 | 7000 |
| Spin amount (rpm) | 97 | 97 | 98 | 96 |
| Scuff resistance | x | ○ | ○ | ○ |
| Yellowing resistance | x | ○ | ○ | ○ |

As is apparent from the results of Tables 3 to 4, the golf balls of the present invention of Examples 1 to 5, when compared with the golf balls of Comparative Examples 1 to 4, are superior in moldability, rebound characteristics, spin performance, scuff resistance and yellowing resistance.

On the other hand, in the golf ball of Comparative Example 1, since the mixture of the polyurethane-based thermoplastic elastomers formed by using aromatic diisocyanate is used as the base resin for the cover, the elastic modulus is not low and the hardness is high, and the spin amount is small. In addition, the scuff resistance is very poor and the yellowing is very easy to occur.

In the golf ball of Comparative Example 2, since the polyurethane-based thermoplastic elastomer formed by using cycloaliphatic diisocyanate is only used as the base resin for the cover, the elastic modulus is not low and the hardness is high, and the spin amount is small. In addition, the moldability, such as the releasability and tack, is very poor.

In the golf ball of Comparative Example 3, since the polyurethane-based thermoplastic elastomer formed by using aliphatic diisocyanate is only used as the base resin for the cover, the elastic modulus is not low and the hardness is high, and the spin amount is small.

In the golf ball of Comparative Example 4, since the polyurethane-based thermoplastic elastomer formed by using cycloaliphatic diisocyanate is only used as the base resin for the cover, the moldability, such as the releasability and tack, is very poor.

What is claimed is:

1. A golf ball comprising a core and a cover formed on the core, wherein the cover comprises a mixture (c) of a component (a) and a component (b) as a base resin, and an elastic modulus of each component satisfies a relationship represented by the following formula:

$$E_a X + E_b Y > E_c$$

(wherein, $E_a$, $E_b$ and $E_c$ represent an elastic modulus of component (a), that of the component (b) and that of the mixture (c), respectively, and X and Y represent a formulation ratio of the component (a) and that of the component (b)), wherein component (a) is a polyurethane-based thermoplastic elastomer formed by using a cycloaliphatic diisocyanate, and component (b) is a polyurethane-based thermoplastic elastomer formed by using an aliphatic diisocyanate and the weight ratio (a/b) of the component (a) to the component (b) is 95/5 to 5/95.

2. The golf ball according to claim 1, wherein the cycloaliphatic diisocyanate is 4,4'-dicyclo-hexylmethane diisocyanate ($H_{12}$MDI), and the aliphatic diisocyanate is 1,6-hexamethylene diisocyanate (HDI).

3. The golf ball according to claim 1, wherein the cover has a Shore D hardness of 30 to 55 and a thickness of 0.3 to 2.0 mm.

4. A golf ball comprising a core and a cover formed on the core, wherein the cover comprises a mixture (c) of a component (a) and a component (b) as a base resin, and an elastic modulus of each component satisfies a relationship represented by the following formula:

$$1.2 \leq (E_a X + E_b Y)/E_c \leq 3.0$$

wherein $E_a$, $E_b$ and $E_c$ represent an elastic modules of component (a), that of component (b) and that of the mixture (c), respectively, and X and Y represent a formulation ratio of component (a) and that of component (b), wherein component (a) is a polyurethane-based thermoplastic elastomer formed by using a cycloaliphatic diisocyanate, and component (b) is a polyurethane-based thermoplastic elastomer formed by using an aliphatic diisocyanate, and the weight ratio (a/b) of component (a) to component (b) is 95/5 to 5/95.

* * * * *